E. HOPKINSON.
METHOD OF TIRE MAKING AND APPARATUS THEREFOR.
APPLICATION FILED OCT. 27, 1917.

1,312,505.

Patented Aug. 5, 1919.
3 SHEETS—SHEET 2.

Inventor
Ernest Hopkinson

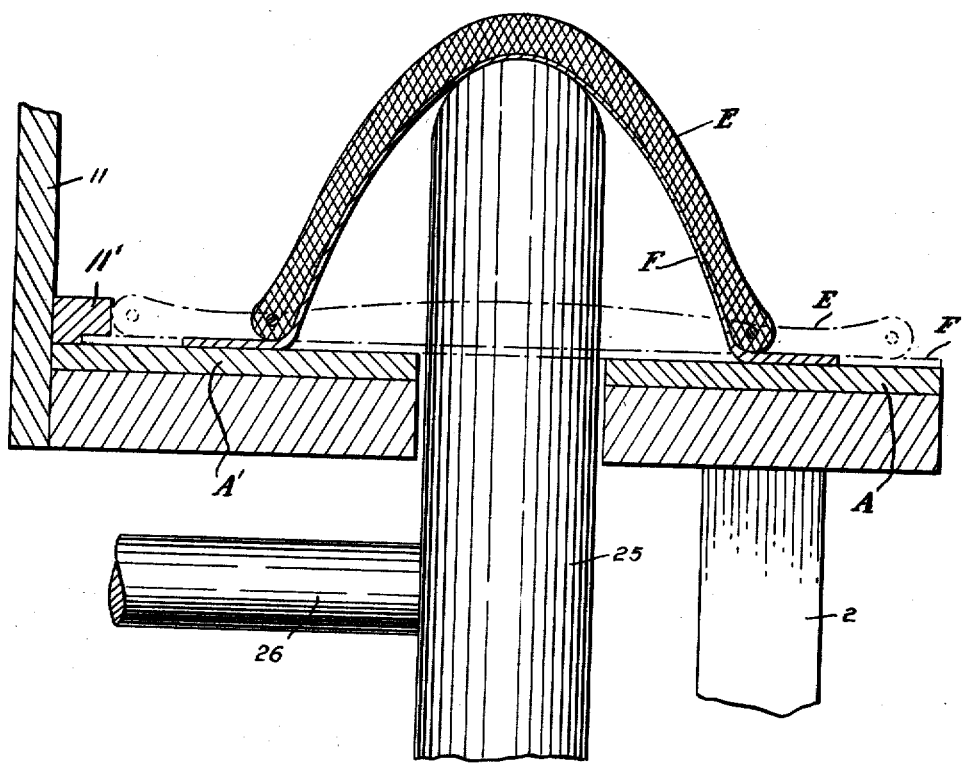

UNITED STATES PATENT OFFICE.

ERNEST HOPKINSON, OF NEW YORK, N. Y.

METHOD OF TIRE-MAKING AND APPARATUS THEREFOR.

1,312,505.  Specification of Letters Patent.  Patented Aug. 5, 1919.

Application filed October 27, 1917. Serial No. 198,789.

*To all whom it may concern:*

Be it known that I, ERNEST HOPKINSON, a citizen of the United States, residing in New York city, county of New York, and State of New York, have invented a certain new and useful Method of Tire-Making and Apparatus Therefor, of which the following is a full, clear, and exact description.

This invention relates to the method of forming a tire from a flat pulley-band casing and to apparatus therefor. In my application filed January 31, 1917, Serial No. 145,591, I have shown and described a pulley-band tire casing and means for shaping the same comprising apparatus for forcing in the edges of the casing simultaneously with the lifting of the center of the casing by the action of an inflatable tube. By the present method the casing is shaped by applying mechanical pressure successively to points along the center line of the casing while gradually increasing the distance between the axis of the casing and the points of application of the pressure.

Broadly stated, my apparatus comprises a cylindrical support for the pulley-band, and one or a series of pressure or forming members arranged to contact with the casing at its center line. Means are provided for relatively moving the forming members and casing about the axis of the latter while gradually increasing the distance between the said axis and the active faces of the forming members.

In the embodiment of the apparatus herein shown and described the forming members are shaped as disks and the drum comprises two spaced sections, free for rotation, the disks being power rotated and having a bodily movement away from the axis of the drum.

Figure 1:
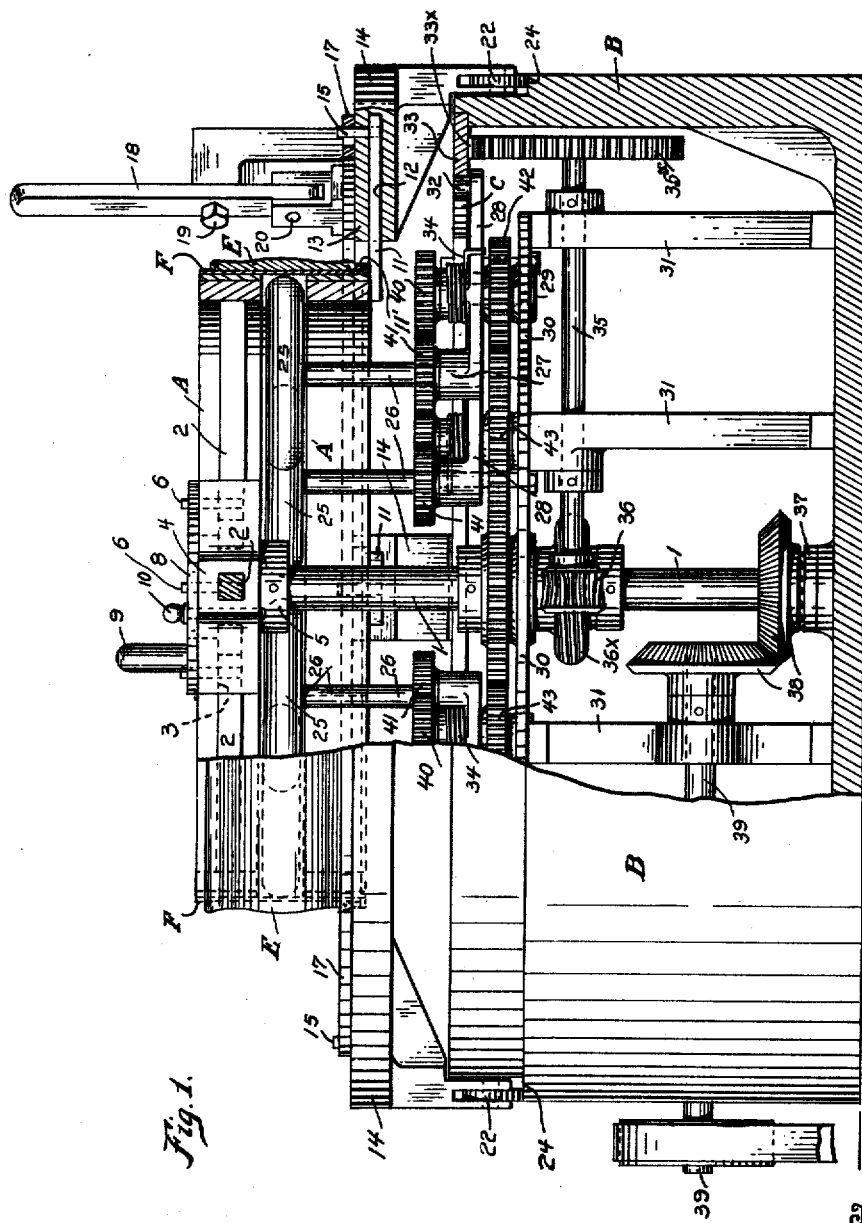
Figure 2:
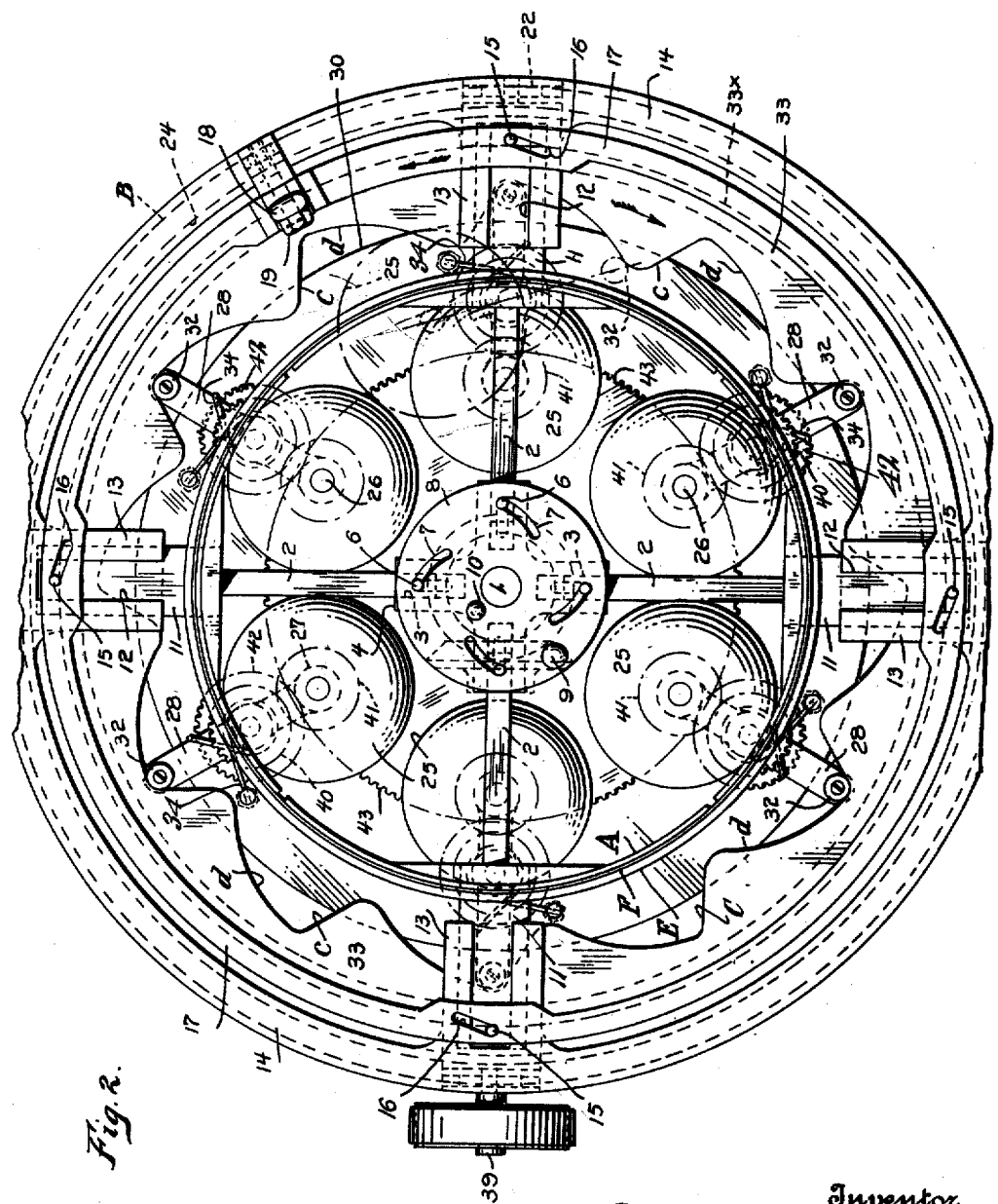

The apparatus will be understood by reference to the accompanying drawings in which, Figure 1 is an elevation partly in section of the present embodiment of the apparatus; Fig. 2 is a plan view of the same; and Fig. 3 is an enlarged detail partly in section illustrating the formed casing and lining.

A description of the apparatus may conveniently be made under three heads, to wit: the drum structure, the forming disks and their bodily movement, and the mechanism for rotating the disks.

*The drum structure.*—By reference to Fig. 1 it will be seen that the drum comprises two spaced sections A, A', each embracing the vertical shaft 1. Each drum section may be expanded or contracted, and to this end is formed of four segmental parts. The segmental parts of the upper drum section A (shown in plan in Fig. 2) are each carried by an arm 2 slidably held within one of a series of sockets 3 formed in a cruciform supporting block 4 loosely mounted upon the upper end of shaft 1 and resting upon collar 5 pinned to the shaft. Each arm 2 carries a pin 6 which projects upwardly into a slot 7 formed in a cam disk 8 rotatably mounted upon shaft 1. By means of an operating handle 9 the disk may be turned to effect the expansion or contraction of the drum section. A pin having an enlarged head 10 and passing through the cam disk and into a socket formed in cruciform block 4, may serve to hold the said upper drum section in its expanded condition.

Each segmental part of the lower drum section A' is carried by a slide block 11 movable in a channel way 12 formed in an arm 13 projecting inwardly from a carriage 14. Each slide block 11 is provided with a pin 15 which projects upwardly into a cam slot 16 formed in a cam-ring 17, so that the operator by turning ring 17 may effect the expansion or contraction of the lower drum section. The cam ring 17 is supported upon the carriage 14, and it may be turned by any suitable means. I have illustrated a conventional form of lever 18 for this purpose, the lever being fulcrumed at 19 upon an arm rigidly connected to the carriage and being pivotally connected with the cam ring at 20.

The carriage 14 is circular, as shown in Fig. 2, and is provided with a series of rollers 22 adapted to run upon the circular trackway 24 formed by reducing the frame B near its upper end. The present embodiment of the invention is such that the carriage, with the drum, is rotated by the frictional drive of the rotary forming disks upon the tire carcass supported by the drum. In some cases, however, it may be found desirable or necessary to rotate the drum independently of the forming members, as, for example, when the forming members are shaped in other than disk form, or, in whatever form, are not rotary. The forming disks and the mechanism for moving them bodily beyond the periphery of the drum, will now be described.

*The forming disks and their bodily movement.*—By reference to Fig. 1 it will be seen that the forming disks 25 are disposed intermediate the two drum sections A, A'. Each forming disk has an outer surface conforming with the desired shape to be imparted to the tire, and is carried at the upper end of a shaft 26, the latter having a bearing within the boss 27 of a lever 28. Lever 28 is fulcrumed upon a shaft 29 mounted to revolve in a base-plate 30 which in turn is supported by bracket arms 31 of main frame B. At the outer end of each lever 28 is a roller stud 32 which is maintained in engagement with the active faces of a cam-ring 33 by means of spiral spring 34. Cam-ring 33 is provided upon its lower surface with a circular rack 33ˣ and this rack is engaged by a gear 35ˣ on a shaft 35 journaled in bracket arms 31 and driven by means of the gears 36, 36ˣ, the latter gear being carried by main shaft 1. The main shaft at its lower end is provided with a thrust bearing 37, and the said shaft is driven through bevel gears 38 by driving shaft 39, the latter receiving its motion from any suitable source of power. The cam-ring 33 is formed with a series of active faces $c$ and retarding faces $d$, these two faces in each of the series merging into a rounded apex. As the cam-ring rotates the active face $c$ swings the disk carrying-lever 28 until each roller stud 32 rides over one rounded apex, whereupon, by the action of coil spring 34, the lever is given a reverse movement, this movement being retarded by face $d$.

By reference to Fig. 2, it will be seen that the location of the fulcrum for each of the disk carrying-levers 28 is such that the rotation of cam-ring 33 in the direction of the arrow, Fig. 2, will move the disks in an arcuate path crossing the peripheral line of the drum.

*The mechanism for rotating the forming disks.*—As above pointed out, each forming disk 25 is carried at the upper end of a vertical shaft 26, which shaft has a bearing in a lever 28 fulcrumed upon a shaft 29. Each shaft 29 is utilized as a drive shaft for a forming disk. To this end, each shaft 29 projects above lever 28 and carries a pinion 40 in mesh with a second pinion 41 on shaft 26. Below the lever 28 each shaft 29 carries a pinion 42 driven by a large gear wheel 43 carried by the main shaft 1. It will be seen that the rotation of gear wheel 43 will impart motion to a shaft 29 which, through pinions 40 and 41, will effect the rotation of the appropriate forming disk. Inasmuch as lever 28 swings axially of pinion 40, this swinging movement does not affect the relationship between pinions 40 and 41.

In carrying the method into effect the apparatus is operated as follows:

The pulley-band casing E having been preferably lined with an expansible metal band F, the casing and lining are placed upon the drum in the position shown in Fig. 1 of the drawings, the drum sections being contracted for this purpose by manipulation of cam disk 8 and cam ring 17. The band is adjusted to seat upon the centering blocks 11' preferably secured to the lower drum section A' thereby centering the band relative to the forming disks. Thereupon the drum sections are expanded and power is applied to the main shaft 1. The rotation of the shaft 1 will, through the instrumentalities herein before described, impart rotation to each one of the forming disks, and at the same time cam ring 33 will be driven in the direction of the arrow, Fig. 2, and the forming disks, will gradually be moved into direct contact with the casing lining. By their frictional engagement with the casing lining, disks 25 will impart a movement to the casing, the drum, and the carriage, so that the casing will as a whole rotate about the forming disks. The forming disks gradually move away from the axis of the drum and in the continued rotation of the latter, the center line of the casing is raised and the side edges of the casing are brought toward each other. The operation continues until the side edges of the casing are brought up from the position occupied in Fig. 1 to a position at right angles thereto, the side edges of the lining F lying over the beads of the tire.

The relative positions of the formed casing and lining are shown in Fig. 3 of the drawings. The lining serves a three fold purpose. First, during the formation of the casing the lining shields the inner wall of the casing from direct contact with the forming member, secondly, the lining serves in a measure to hold the casing against contraction or collapse when it is removed from the machine, and thirdly, the lining in conjunction with a closure ring for the two edges of the casing will afford an expansible fluid tight container to be used in place of an air bag to expand the casing within the vulcanizing mold, as will be understood without further explanation.

Having thus described my invention, what I claim and desire to protect by Letters Patent is:

1. The method of forming a tire from a pulley band structure which comprises subjecting the central portion of the band to the influence of a distending force applied to a relatively small portion of the band and progressing circumferentially therearound.

2. The method of forming a tire from a pulley band structure which comprises subjecting the central portion of the band to the influence of a plurality of distending forces applied to relatively small portions of the band and progressing circumferentially therearound.

3. The method of forming a tire from a pulley band structure which comprises subjecting the central portion of the band to the influence of a distending force applied to a relatively small portion of the band through a malleable wall and progressing circumferentially therearound.

4. The method of forming a tire from a pulley band structure which comprises subjecting the central portion of the band to the influence of a plurality of distending forces applied to relatively small portions of the band through a malleable wall and progressing circumferentially therearound.

5. The method of forming a tire from a pulley band structure which comprises subjecting the central portion of the band to the influence of a distending force applied to a relatively small portion of the band and progressing circumferentially therearound while maintaining the circumferential edge portions in substantially registering relation with each other.

6. The method of forming a tire from a pulley band structure which comprises subjecting the central portion of the band to the influence of a plurality of distending forces applied to relatively small portions of the band and progressing circumferentially thereabout while maintaining the circumferential edge portions in substantially registering relation with each other.

7. The method of forming a tire from a pulley band structure which comprises subjecting the central portion of the band to the influence of a distending force applied to a relatively small portion of the band through a malleable wall and progressing circumferentially therearound while maintaining the circumferential edge portions in substantially registering relation with each other.

8. The method of forming a tire from a pulley band structure which comprises subjecting the central portion of the band to the influence of a plurality of distending forces applied to relatively small portions of the band through a malleable wall and progressing circumferentially thereabout while maintaining the circumferential edge portions in substantially registering relation with each other.

9. A tire making apparatus for forming a tire from a pulley band structure comprising a supporting drum for the band, a rotary forming member for engaging the band interiorly, and means for simultaneously rotating the member and moving same bodily outward.

10. A tire making apparatus for forming a tire from a pulley band structure, comprising a plurality of forming members adapted to engage the band interiorly, means adapted to relatively move the band and members whereby the latter progressively engage the interior of the band circumferentially therearound, and means for relatively moving the members to increase the circumference of the band engaged.

11. A tire making apparatus for forming a tire from a pulley band structure, comprising a plurality of rotary forming members adapted to engage the band interiorly, means for rotating the members, and means for moving the members outwardly.

12. A tire making apparatus for forming a tire from a pulley band structure comprising a plurality of rotary forming members adapted to engage the band interiorly and arranged to define a circumference, means adapted to relatively move the band and members whereby the latter progressively engage the interior of the band circumferentially therearound, and means for relatively moving the members to define larger circumferences.

13. A tire making apparatus for forming a tire from a pulley band structure, comprising a forming means adapted to engage the band interiorly, means adapted to relatively move the band and forming means whereby the latter progressively engages the interior of the band circumferentially therearound, means for moving the forming means to increase the circumference of the band engaged, and means for maintaining the edge portions of the band in substantial alinement with each other.

14. A tire making apparatus for forming a tire from a pulley band structure, comprising a forming means adapted to engage the band interiorly, means for centrally positioning said band with relation to said forming means, means adapted to relatively move the band and forming means whereby the latter progressively engages the interior of the band circumferentially therearound, and means for moving the forming means to increase the circumference of the band engaged.

15. A tire making apparatus adapted to form a tire from a pulley band structure comprising a forming means adapted to engage the band interiorly, an expansible support for the band, means adapted to relatively move the support and forming means whereby the latter progressively engage the interior of the band circumferentially thereabout, and means for moving the forming means to increase the circumference of the band engaged.

16. Tire making apparatus adapted to form a tire from a pulley band casing, comprising in combination, a forming member, a casing support, and means for relatively moving said member and support about the axis of a casing held upon the support.

17. In tire making apparatus, a cylindrical casing support, a forming member, means for relatively moving the forming member and support about the axis of the latter, and means for varying the distance between said axis and the active face of the forming member.

18. In tire making apparatus, a cylindrical casing support, a forming member, and means for automatically effecting a relative movement of the forming member and support about the axis of the latter, and for simultaneously increasing the distance between said axis and the active face of the forming member.

19. In tire making apparatus, a drum having an open intermediate peripheral section, a forming member in register with the said open section of the drum, means for relatively moving the forming member and drum about the axis of the latter, and means for moving the forming member beyond the periphery of the drum.

20. In tire making apparatus, a drum, a forming disk, means for rotating said disk, and means for moving the disk beyond the periphery of the drum.

21. In tire making apparatus, a drum having an open intermediate peripheral section, a rotary forming member in register with the said open section of the drum, and means for simultaneously rotating and bodily moving the forming member.

22. In tire making apparatus, a drum, a forming disk, means for rotating the said disk, and means for gradually imparting a bodily movement to the disk beyond the periphery of the drum.

23. In tire making apparatus, a rotary tire casing support adapted to expose the casing along its inner center line, a forming member adapted to contact with the casing at its said exposed portion, means for relatively moving the forming member and support about the axis of the latter, and means for varying the distance between said axis and the active face of the forming member.

24. In tire making apparatus, a tire casing support adapted to expose a casing at its inner center line, a series of rotary disks adapted to contact with the casing at the said exposed portion, means for relatively rotating the support and disks, and means including a member common to all of the disks for imparting a bodily movement to the latter whereby the active face of each disk may be carried beyond the outer face of the support.

Signed at New York, N. Y., this 25th day of October, 1917.

ERNEST HOPKINSON.

Copies of this patent may be obtained for five cents each, by addressing the "Commissioner of Patents, Washington, D. C."